US008658323B2

(12) United States Patent
Fujimura et al.

(10) Patent No.: US 8,658,323 B2
(45) Date of Patent: Feb. 25, 2014

(54) SOLID OXIDE FUEL CELL GENERATION SYSTEM

(75) Inventors: Hidekazu Fujimura, Mito (JP); Hiromi Tokoi, Tokai (JP); Shin Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1144 days.

(21) Appl. No.: 12/246,600

(22) Filed: Oct. 7, 2008

(65) Prior Publication Data

US 2009/0104484 A1    Apr. 23, 2009

(30) Foreign Application Priority Data

Oct. 12, 2007 (JP) ................. 2007-266535

(51) Int. Cl.
*H01M 8/06* (2006.01)
*H01M 8/18* (2006.01)
*H01M 8/04* (2006.01)

(52) U.S. Cl.
USPC ........... 429/415; 429/408; 429/412; 429/416; 429/417; 429/423; 429/425; 429/429

(58) Field of Classification Search
None
See application file for complete search history.

(56) References Cited

U.S. PATENT DOCUMENTS 6,520,273 B1 * 2/2003 Ishikawa ................. 429/415
6,958,195 B2 * 10/2005 Assarabowski et al. ...... 429/415
2003/0170510 A1 * 9/2003 Robb et al. ................. 429/17
2005/0053816 A1 * 3/2005 Bhargava et al. ........... 429/26
2009/0047557 A1 * 2/2009 Qi ................................ 429/27

FOREIGN PATENT DOCUMENTS

| JP | 11-162492 | 6/1999 |
|---|---|---|
| JP | 2002-352826 | 12/2002 |
| JP | 2004-87377 | 3/2004 |
| JP | 2004-247247 | 9/2004 |
| JP | 2004-281330 | 10/2004 |
| JP | 2006-302660 | 11/2006 |

OTHER PUBLICATIONS

JP Office Action of Application No. 2007-266535 dated Jul. 24, 2012 with partial English translation.

* cited by examiner

*Primary Examiner* — Michael Jung
(74) *Attorney, Agent, or Firm* — Antonelli, Terry, Stout & Kraus, LLP.

(57) ABSTRACT

The invention provides a solid oxide fuel cell generation system and a start up method thereof which heat up a reformer and a cell main body without any water and nitrogen gas, and start up for a short time until a power generation and without deteriorating a reliability of the cell. In a solid oxide fuel cell generation system having a power generation cell including an anode, a cathode and a solid electrolyte membrane, a mixing portion for obtaining a mixed gas by mixing a used fuel gas discharged from the anode with a raw fuel, a reducing combustion gas generating apparatus, and a reforming portion, the reducing combustion gas generating apparatus has a starting burner generating a reducing combustion gas, and the mixing portion, the reducing combustion gas generating apparatus, the reforming portion and the anode are coupled alphabetically from an upstream side.

9 Claims, 4 Drawing Sheets

SOLID OXIDE FUEL CELL GENERATION SYSTEM

BACKGROUND OF THE INVENTION (1) Field of the Invention

The present invention relates to a solid oxide fuel cell generation system and start up method thereof.

(2) Description of Related Art

In the solid oxide fuel cell, it is necessary to heat up a whole to a predetermined temperature capable of generating power at a time of starting. Further, a hydrogen necessary for generating power is supplied by reforming a city gas, a propane gas or the like corresponding to a raw fuel, and there are an internal reforming method in which the raw fuel is directly supplied to an anode side so as to be reformed in an inner portion of a power generation cell, and an external reforming method in which a reformer is provided in an outer portion of the power generation cell, and a gas reformed by the reformer is supplied to the power generation cell. Particularly, in the case of the external reforming method, it is necessary to heat up the reformer to a temperature capable of carrying out a reforming reaction, in the same manner as the power generation cell.

In the conventional power generation cell heating method, there is employed a method of heating by an electric heater attached around the power generation cell, a method of supplying an air heated to a high temperature by setting a heating apparatus in an air piping supplying to a cathode, or the like.

In this case, if an oxidizing gas such as the air or the like comes into contact with the anode side, the anode is oxidized, and a conductivity and an electrode activity are lost. Accordingly, there are various devices in preventing the oxidizing gas such as an oxygen or the like from flowing in the anode, for example, by circulating a hydrogen gas as a reducing gas to the anode side at a time of starting.

For example, in patent document 1 (JP-A-11-162492), there is disclosed a method of heating while keeping a reducing atmosphere by supplying an incomplete combustion gas to the anode side, as one example of the internal reforming method.

At a time of starting the reformer, the reformer is heated by circulating the high-temperature gas used for heating the power generation cell mentioned above to the combustion gas side of the reformer. It is necessary to supply the reducing gas such as a nitrogen, the hydrogen or the like corresponding to an inert gas to the fuel gas side flow path in the light of preventing a reforming catalyst from being deteriorated, in the same manner as the power generation cell. Further, a water vapor which is necessary for a reforming reaction in the reformer is supplied by evaporating a stored pure water by an evaporator, from the start to the power generation.

In this case, for example, in patent document 2 (JP-A-2004-247247), there is disclosed a means for utilizing a water generated within the anode on the basis of an electrochemical reaction for reforming, by recycling a reacted fuel gas in an outlet of the anode to the reformer in accordance with a fuel recycle system, with regard to reservation of the water vapor, during the power generation. Accordingly, the pure water and the evaporator are not necessary conceptually.

However, in accordance with the start up method of the fuel cell described in the patent document 1, the anode side is not in the reducing atmosphere until the cell temperature reaches 400° C., and the combustion gas of the oxidizing atmosphere is supplied thereto. Accordingly, there is considered that a reliability of the anode can be further improved, if it is possible to heat in the reducing atmosphere from an initial stage of the start. Further, there is a case that an oxidation resistance can be kept only at a further lower temperature, due to a material of the fuel cell, a difference of a manufacturing process or the like.

It is preferable to set an air ratio to be equal to or less than 1 for generating the combustion gas of the reducing atmosphere, however, the combustion temperature comes to 2000° C. at an adiabatic flame temperature in the vicinity of 1. Accordingly, it is not preferable in the light of a strength of the fuel cell to directly make the room-temperature fuel cell expose to the high-temperature combustion gas, because a heat stress is generated due to a great temperature difference. If the air ratio is lowered for holding down the temperature of the combustion gas, there is generated such a problem as a generation of soot and an instability of combustion.

Further, there is a method of adjusting the temperature by mixing the nitrogen of the inert gas with the reducing combustion gas having an air ratio equal to or less than 1, for example, 0.9, however, an auxiliary facility for supplying the nitrogen is necessary, and a system is complicated. In other words, there has not been developed a means supplying the reducing gas to the anode without using the inert gas such as the nitrogen or the like, and without generating any great temperature difference in the inner portion of the fuel cell.

The patent document 1 describes the start up method of the internal reforming method, and does not describe the power generation system of the external reforming method. In the external reforming method, it is necessary to secure the water vapor required for reforming before the power generation, and accordingly the pure water and the evaporator thereof have been conventionally necessary.

In accordance with the patent document 2, the pure water and the evaporator are not necessary conceptually during the power generation in accordance with the fuel recycle method, however, the patent document 2 does not disclose a system structure and a start up method which are necessary for achieving both the heating of the power generation system, and the reservation of the water vapor and the control of the reforming rate, from the start to the power generation.

BRIEF SUMMARY OF THE INVENTION

Accordingly, an object of the present invention is to provide a solid oxide fuel cell generation system and a start up method thereof which generates power by generating a reactive gas including a necessary amount of hydrogen from a reformer without supplying a pure water and a nitrogen gas from an external portion from a starting time, and without deteriorating a reliability of the fuel cell, mainly in a cell external reforming method (including a partial reforming).

In order to achieve the object mentioned above, in accordance with the present invention, there is provided a solid oxide fuel cell generation system including a power generation cell having an anode, a cathode and a solid electrolyte membrane, a mixing portion for obtaining a mixed gas by mixing a used fuel gas discharged from the anode with a raw fuel, a reducing combustion gas generating apparatus, and a reforming portion, wherein the reducing combustion gas generating apparatus has a starting burner generating a reducing combustion gas, and the mixing portion, the reducing combustion gas generating apparatus, the reforming portion and the anode are coupled alphabetically from an upstream side.

Further, in accordance with the present invention, there is provided a solid oxide fuel cell generation system including a power generation cell having an anode, a cathode and a solid electrolyte membrane, a mixing portion for obtaining a mixed gas by mixing a used fuel gas discharged from the anode with a raw fuel, a circulation driving means for circulating the used fuel gas, a reducing combustion gas generating apparatus, and a reforming portion, wherein the reducing combustion gas generating apparatus has a starting burner generating a reducing combustion gas, and the mixing portion, the circulation driving means, the reducing combustion gas generating apparatus, the reforming portion and the anode are coupled alphabetically from an upstream side.

In the solid oxide fuel cell generation system in accordance with the present invention, it is preferable that a combustion gas cooler heat exchanging between an air fed to the cathode and the reducing combustion gas is provided between the reducing combustion gas generating apparatus and the reforming portion.

In the solid oxide fuel cell generation system in accordance with the present invention, it is preferable that the starting burner of the reducing combustion gas generating apparatus is constituted by a low calorie combustion burner for burning the mixing gas having a low heat generation amount.

In the solid oxide fuel cell generation system in accordance with the present invention, it is preferable that the solid oxide cell generation system is provided with a bypass piping for feeding the air fed to the cathode without putting through the combustion gas cooler.

In the solid oxide fuel cell generation system in accordance with the present invention, it is preferable that the used combustion gas discharged from an outlet of the anode is provided with a recycle gas cooler heat exchanging the used combustion gas and the air fed to the cathode, between an outlet of the anode and the mixing portion.

Further, in accordance with the present invention, there is provided a start up method of a solid oxide fuel cell generation system including at least a power generation cell having an anode, a cathode and a solid electrolyte membrane, a mixing portion for obtaining a mixed gas by mixing a used fuel gas discharged from the anode with a raw fuel, a reducing combustion gas generating apparatus, a combustion gas cooler heat exchanging between an air fed to the cathode and the reducing combustion gas, and a reforming portion, wherein the reducing combustion gas generating apparatus has a starting burner generating a reducing combustion gas, and the mixing portion, the reducing combustion gas generating apparatus, the combustion gas cooler, the reforming portion and the anode are coupled alphabetically from an upstream side, and wherein the method includes a step of generating the reducing combustion gas by burning the mixing gas by the reducing combustion gas generating apparatus under an air ratio equal to or less than 1 from the starting, a step of cooling the reducing combustion gas to a temperature which is suitable for heating the anode by the air flowing through the combustion gas cooler, a step of heating the cathode by the air heated by the reducing combustion gas in the combustion gas cooler, a step of heating a reforming gas flow path of the reforming portion by the reducing combustion gas output from the combustion gas cooler, and a step of heating the anode and circulating a part or a whole of the reducing combustion gas output from the anode to the reducing combustion gas generating apparatus.

Further, in accordance with the present invention, there is provided a start up method of a solid oxide fuel cell generation system including at least a power generation cell having an anode, a cathode and a solid electrolyte membrane, a mixing portion for obtaining a mixed gas by mixing a used fuel gas discharged from the anode with a raw fuel, a circulation driving means for circulating the used fuel gas, a reducing combustion gas generating apparatus, a combustion gas cooler heat exchanging between an air fed to the cathode and the reducing combustion gas, and a reforming portion, wherein the reducing combustion gas generating apparatus has a starting burner generating a reducing combustion gas, the mixing portion, the circulation driving means, the reducing combustion gas generating apparatus, the combustion gas cooler, the reforming portion and the anode are coupled alphabetically from an upstream side, and a bypass piping for feeding an air fed to the cathode without putting through the combustion gas cooler is provided between an inlet and an outlet of the combustion gas cooler, and wherein the method includes a step of shutting off the combustion air to the reducing combustion gas generating apparatus, at a time when the power generation cell and the reforming portion respectively reach predetermined temperatures and an amount of a water vapor included in the reducing combustion gas reaches a flow rate which is necessary for reforming, during a temperature rising process at a time of starting, a step of increasing a power generating air flowing through the bypass piping by reducing a flow rate of the power generating air passing through the combustion gas cooler, a step of increasing the raw fuel until reaching a predetermined cell temperature after starting the power generation, and increasing a power generation amount, and a step of controlling a circulating flow rate of the used fuel gas in conformity to a flow rate of the power generating fuel gas by using the circulation driving means, as well as monitoring a temperature of the power generation cell and the reforming portion.

Further, in accordance with the present invention, there is provided a start up method of a solid oxide fuel cell generation system comprising at least a power generation cell having an anode, a cathode and a solid electrolyte membrane, a mixing portion for obtaining a mixed gas by mixing a used fuel gas discharged from the anode with a raw fuel, a circulation driving means for circulating the used fuel gas, a reducing combustion gas generating apparatus, a combustion gas cooler heat exchanging between an air fed to the cathode and the reducing combustion gas, and a reforming portion, wherein the reducing combustion gas generating apparatus has a starting burner generating a reducing combustion gas, and the mixing portion, the circulation driving means, the reducing combustion gas generating apparatus, the combustion gas cooler, the reforming portion and the anode are coupled alphabetically from an upstream side, wherein the method includes a step of circulating the reducing combustion gas to the anode of the power generation cell and the reforming portion from the starting to the start of power generation, and a step of controlling by using the circulation driving means so as to set a water vapor amount at which a reforming gas capable of generating power is generated in the reforming portion to a control target, in conformity to a load pattern up to a rated load.

In accordance with the present invention, it is possible to efficiently heat the reformer and the power generation cell for a short time without supplying any inert gas such as the water, the nitrogen or the like from the external portion at all and without deteriorating the reliability of the fuel cell, from the starting to the power generation.

Other objects, features and advantages of the invention will become apparent from the following description of the embodiments of the invention taken in conjunction with the accompanying drawings.

DETAILED DESCRIPTION OF THE INVENTION

A description will be given below of an embodiment relating to a fuel cell generation system and a start up method thereof in accordance with the present invention with reference to the accompanying drawings.

Embodiment 1

Figure 1:
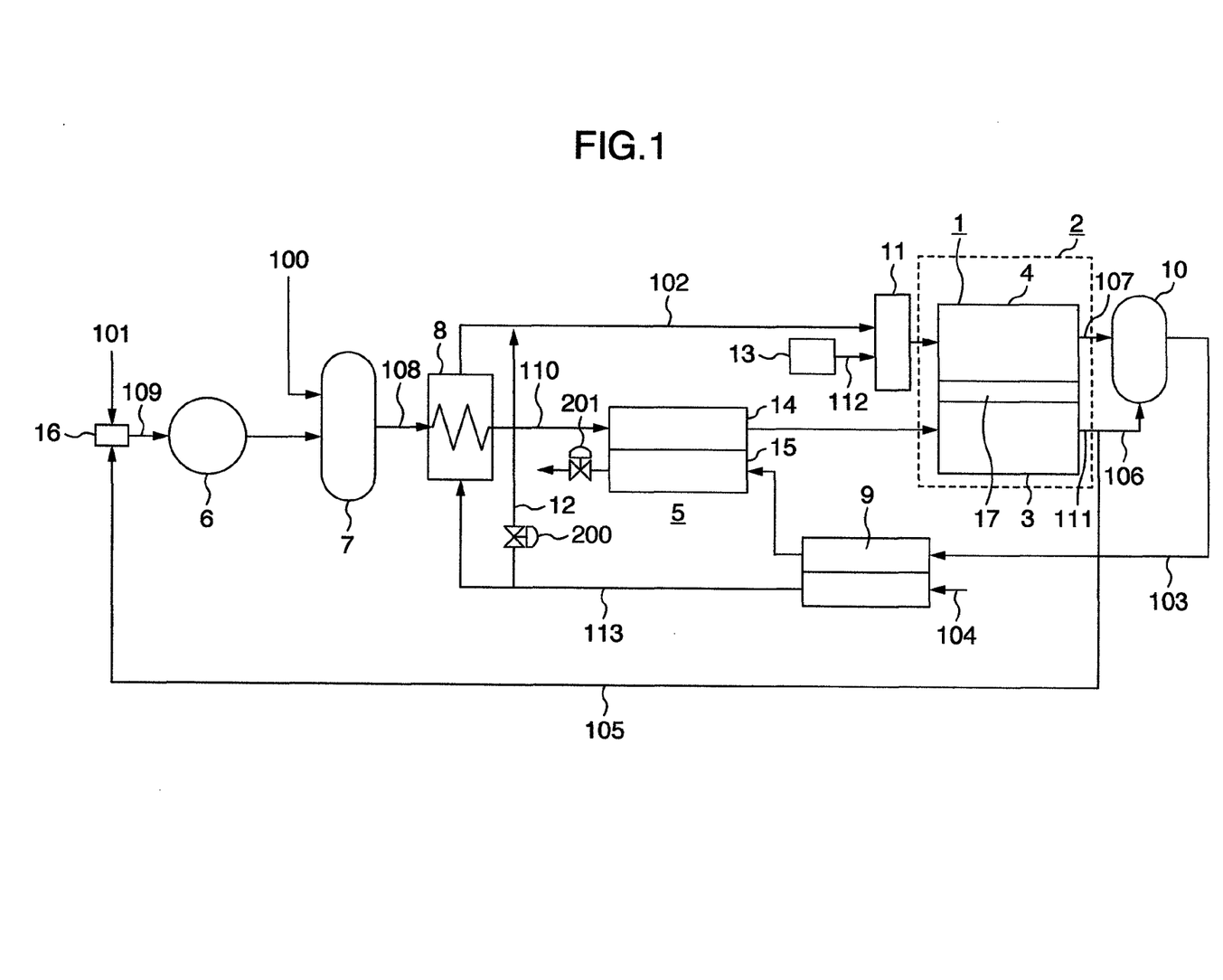
FIG. 1 is a view of a system structure showing an embodiment 1 of a fuel cell generation system in accordance with the present invention.

FIG. 1 shows an embodiment 1 of a fuel cell generation system in accordance with the present invention. The fuel cell generation system in accordance with the present invention has a power generation cell 1 constructed by a solid electrolyte membrane 17 sandwiched by a pair of electrodes including an anode 3 and a cathode 4, a cell stack 2 to which a lot of power generation cells 1 are connected, a reforming portion 5 generating a reforming gas including a hydrogen from a raw fuel, a reducing combustion gas generating apparatus 7 generating a reducing combustion gas including a hydrogen and a water vapor, a combustion gas cooler 8 cooling a generated reducing combustion gas 108 to a suitable temperature, and a circulation driving means 6 for circulating a reducing combustion gas.

Further, the fuel cell generation system is provided with a combustion chamber 10 carrying out a combustion by using a gas discharged from an outlet of the cathode 4 and an outlet of the anode 3, an air preheater 9 preheating an air 104 by a combustion exhaust gas 103 generated from the combustion chamber 10, an air manifold 11 uniformly distributing the air heated by the air preheater 9 and a combustion gas cooler 8 to the cathode 4 of the power generation cell 1, and a temperature raising auxiliary combustion apparatus 13 for heating the cathode 4 in the air manifold 11.

In the anode 3 of the power generation cell 1, the hydrogen generated in a reforming gas flow path 14 of the reforming portion 5 reacts with an oxygen ion moving from the cathode 4 through the electrolyte membrane 17, and a water is generated. The oxygen in the air corresponding to an oxidizing agent is changed to the oxygen ion in the cathode 4.

The reforming portion 5 has the reforming gas flow path 14 in which a reforming catalyst is installed, and a combustion exhaust gas flow path 15 through which the high-temperature combustion exhaust gas 103 supplied from the combustion chamber 10 flows. A valve 201 is provided in a downstream side of the combustion exhaust gas flow path 15, it is possible to recycle an outlet gas 111 from the anode 3 without discharging the combustion exhaust gas 103 to an external portion of the system, by closing the valve 201. The reforming gas flow path 14 is connected to the anode 3, and is heated by the combustion exhaust gas 103 during the power generation, and a methane, a propane, a butane, an ethane or the other hydro carbons than C2 corresponding to a raw fuel is thermally decomposed by a reforming catalyst within the reforming gas flow path 14. These hydro carbons are changed to the hydrogen or a carbon monoxide and is fed to the anode 3.

Twice or more water vapor as much as the hydro carbon is indispensable at least in a volume flow rate ratio for this reforming reaction, and if the water vapor runs short, a carbon precipitation is generated, thereby adversely affecting the reforming catalyst. Further, a speed of the reforming reaction is changed by a temperature of the reforming portion 5. In a range between 400° C. and 700° C., the higher the temperature is, the more the reforming reaction makes progress. Further, at a time of starting, the reducing combustion gas 108 flows through the reforming gas flow path 14, and the combustion exhaust gas 103 flows through the combustion exhaust gas flow path so as to heat up the reforming portion 5.

In this case, in the anode 3 of the power generation cell 1, the methane included in the reforming gas supplied from the reforming portion 5 is also reformed by the anode 3, and the hydrogen and the carbon monoxide are generated. Accordingly, in the anode 3, the hydrogen is consumed in accordance with an electrochemical reaction, and the hydrogen is generated in accordance with a reforming reaction.

In the reducing combustion gas generating apparatus 7, the combustion is carried out in a state in which the air ratio is equal to or less than 1, that is, the oxygen runs short than a chemically correct mixture ratio, by using the hydro carbon such as the methane, the propane, the butane, the ethane or the other hydro carbon than C2 corresponding to the raw fuel and the combustion air 100 at a time of starting. Accordingly, the oxygen is not included in the combustion gas generated from the reducing combustion gas generating apparatus 7, and a so-called reducing combustion gas is generated.

Further, the reducing combustion gas generating apparatus 7 has a combustion burner which can mix the reducing combustion gas as mentioned above with the raw fuel so as to burn. Since the fuel is diluted by mixing the reducing combustion gas, a calorific power of the fuel is lowered. A low-calorie combustion burner is necessary as a burner burning the fuel having a low calorie and a great amount of volume flow rate. The combustion burner mentioned above is used, for example, in the combustor of the gas turbine.

In this case, since the combustion air 100 is shut off during the power generation, the combustion is not carried out in the reducing combustion gas generating apparatus 7, but a mixed gas 109 of the raw fuel and a reaction used fuel gas 105 recycled from the outlet of the anode 3 only passes therethrough. In this case, an inner side of the reducing combustion gas generating apparatus 7 has an operation of uniformly mixing the mixed gas 109.

The combustion gas cooler 8 is structured such as to cool the reducing combustion gas 108 generated by the combustion gas generating apparatus 7 to a predetermined temperature, and heat the cathode temperature raising air 104 corresponding to the cooling medium. The combustion gas cooler 8 is mainly used in a temperature raising process from the starting, and there is a case that the air 104 is bypassed by an illustrated bypass piping 12 in the case that the temperatures of the power generation cell 1 and the reforming portion 5 become equal to or higher than the predetermined temperatures. Further, the air fed in the combustion gas cooler 8 in the present embodiment comes to the air 113 in the outlet of the air preheater 9, however, in the case that the temperature of the gas 110 in the outlet of the combustion gas cooler 8 becomes high, the air 113 may be partly bypassed through the bypass piping 12 and the air which is not heated may be independently supplied to the combustion gas cooler 8 from the external portion, in the case that the temperature of the gas 110 in the outlet of the combustion gas cooler 8 becomes high.

The circulation driving means 6 circulates the gas 110 in the outlet of the combustion gas cooler 8 in the reforming gas flow path 14 of the reforming portion 5 and the anode 3 of the power generation cell 1, and recycles the outlet gas 111 from the anode 3 so as to combine with the fuel 101 for burning and generating power in the mixing portion 16. As a specific circulation driving means 6, an ejector may be used; in addition, a blower, a fan or a pump may be used. Further, since the position of the circulation driving means 6 is installed in a downstream side of the mixing portion 16, it is possible to achieve two functions of supplying the fuel 101 and circulating the recycle gas 105 by one, and it is possible to simplify the system.

The combustion chamber 10 is connected to the cathode 4 and the anode 3, is structured such as to burn an unburned combustible in the reducing combustion gas included in an anode outlet gas 106 at a time of starting or an unreacted fuel at a time of generating power by using a reacted and used air 107 in the outlet of the anode, and generates the combustion exhaust gas 103 within the combustion chamber 10.

The air preheater 9 is connected to a downstream side of the combustion chamber 10, heat exchanges between the combustion exhaust gas 103 from the combustion chamber 10 and the air 104 for generating power or raising the temperature of the cathode, and heats up the air 104. Further, the combustion exhaust gas discharged form the air preheater 9 is connected to the combustion exhaust gas flow path 15 of the reforming portion 5, and flows in the combustion exhaust gas flow path 15 so as to supply the heat necessary for the reforming reaction to the reforming gas flow path 14 side.

The air manifold 11 is connected to the cathode 4 of each of the power generation cells 1 of the cell stack 2, and uniformly distributes the air to each of the cathodes 4. The air manifold 11 is connected to the air side of the combustion gas cooler 8 or the air preheater 9, and is structured such that a heated air 102 flows therein. The heated air 102 is fed to each of the cathodes 4 via the air manifold 11, and has charge of heating the power generation cell 1 at a time of starting, and supplying the oxidizing agent and cooling the power generation cell 1 at a time of generating power.

The temperature raising auxiliary combustion apparatus 13 is structured such as to assist the heating by the heated air 102 at a time of starting. This is connected to the air manifold 11, and the combustion gas is generated by the combustion burner provided in the temperature raising auxiliary combustion apparatus 13 so as to be fed to the air manifold 11, and is mixed with the heated air 102.

In the fuel cell generation system in accordance with the present invention, the methane is fed as the fuel 101 for combustion to the reducing combustion gas generating apparatus 7 by the circulation driving means 6 at a time of starting, and the air 100 for combustion is supplied from the external portion by a blower (not shown). The air ratio at this time is set to be equal to or less than 1, and is preferably made as small as possible. However, it is controlled in a range which secures a combustion stability and suppresses a soot generation.

The air ratio is set to about 0.9 in the present embodiment. Since the adiabatic flame temperature of the combustion at this time gets over 2000° C., it is desirable to start the flow rate of the fuel 101 from a minimum level.

The reducing combustion gas 108 does not include the oxygen, but mainly includes the water vapor, the carbon monoxide, the hydrogen, the carbon dioxide and the nitrogen. The reducing combustion gas 108 is fed to the reforming gas flow path 14 of the reforming portion 5 after being cooled by the combustion gas cooler 8. The reforming catalyst is filled in the reforming gas flow path 14 of the reforming portion 5, and a cooling effect is great because of a great heat capacity. Further, since the reforming catalyst itself is a granular filler, and can disperse the heat stress even if a great temperature distribution is generated in a flow direction by the high-temperature reducing combustion gas 108, a reliability is high in the light of the strength. Accordingly, it is not necessary to cool the reducing combustion gas 108 more than necessary by the combustion gas cooler 8, and it is possible to make the combustion gas cooler 8 compact.

Further, as a specification factor of the reforming catalyst, a material having a high heat resistance, that is, a material which can resist the high-temperature gas is desirable. In the case that a partial reforming is carried out, a nickel catalyst, a ruthenium catalyst or the like which can resist 1000° C. or higher is desirable.

As mentioned above, it is possible to cool down the temperature of the reducing combustion gas 108 getting out of the reforming portion 5 to the heat resisting temperature of the anode 3, for a while after starting, by setting the reforming portion 5 which has a great heat capacity and is hard to be affected by the temperature distribution in the flow direction, between the reducing combustion gas generating apparatus 7 and the anode 3.

Further, since the reducing combustion gas generating apparatus 7 is installed in an upstream side of the reforming portion 5, it is possible to set the number of the supply port for the combustion and the power generating fuel 101 to one. Accordingly, the fuel system can be more simplified.

The outlet gas 111 passing while heating the combustion gas cooler 8, the combustion exhaust gas flow path 14 of the reforming portion 5 and the anode 3 flows through the recycle line from the outlet of the anode 3 by the circulation driving means 6 so as to reflow to the mixing portion 16. In the present embodiment, the combustion gas at a mass flow rate which is equal to a mass flow rate obtained by adding the mass flow rates of the raw fuel and the air is flown back. The recycled combustion gas 105 is combined with the combustion fuel 101 in the mixing portion 16 so as to be fed to the combustion gas generating apparatus 7 again via the circulation driving means 6.

In this case, the calorific power of the recycled combustion gas 105 is significantly smaller than the methane, and is a negligible level. Accordingly, the calorific power per volume of the mixed gas 109 becomes equal to or less than $\frac{1}{10}$. Further, the mixed gas 109 includes about 15% of water content. Therefore, in order to burn the mixed gas 109 having the nature mentioned above, it is necessary to provide a low-calorie burner in the reducing combustion gas generating apparatus 7. As a result, the temperature of the reducing combustion gas 108 getting out of the reducing combustion gas generating apparatus 7 is lowered to about 1100 to 1300° C.

The reducing combustion gas 108 again passes through the combustion gas cooler 8, and is recirculated while heating the reforming portion 5 and the anode 3. At this time, a flow rate of the air 104 and a flow rate of the combustion gas which are supplied to the combustion gas cooler 8 are adjusted, as well as monitoring the temperatures of the reforming gas flow path portion 14 and the anode 3, and the temperature of the reforming gas in the inlet of the anode 3. For example, in the case that the temperature raising speed is slow, the flow rates of the fuel 101 and the air 100 are increased while keeping the air ratio, and the flow rate of the air 104 supplied to the combustion gas cooler 8 is reduced. On the contrary, in the case that the temperature rise in the inlet of the anode 3 is faster than schedule, the flow rate of the air 104 to the combustion gas cooler 8 is increased.

The flow rate and the temperature of the air 102 introduced to the cathode 4 are changed in accordance with the temperature control of the anode 3, on the basis of the operation mentioned above, however, the heating of the cathode 4 is adjusted by using a temperature raising auxiliary combustion apparatus 13 mentioned below, in order to reduce the adverse effect with respect to the heating of the cathode 4 as much as possible.

As an aspect of the heating of the anode 3, it is desirable to increase the flow rates of the fuel 101 and the recycle gas (the circulation reducing combustion gas) 105 as much as possible, and supply a lot of reducing combustion gas 110 having a middle temperature such as about 400° C. to 700° C. to the reforming portion 5 and the anode 3 after starting the operation before starting the power generation. This does not deteriorate the reliability of the power generation cell 1, and causes to increase the temperature raising speed.

In this case, the cathode 4 is heated by supplying the air 102 heated by the combustion gas cooler 8 to the cathode 4 via the air manifold 11. Further, in order to make the temperature difference between the anode 3 and the cathode 4 small, the temperature raising auxiliary combustion apparatus 13 is started in conformity to the start of the reducing combustion gas generating apparatus 7. In the case that the heating of the cathode 4 runs short after starting, the combustion gas 112 from the temperature raising auxiliary combustion apparatus 13 is continuously supplied to the air manifold 11. Further, the combustion exhaust gas 103 from the combustion chamber 10 heats the air 104 for raising the temperature of the cathode 3 by the air preheater 9, and is also used for heating the reforming portion 5 in a downstream side.

If the temperatures of the power generation cell 1 and the reforming portion 5 respectively come to the ranges of the temperature capable of generating power and the temperature capable of reforming, the flow rate of the recycle gas 105 is adjusted by controlling the circulation driving means 6 and the pressure adjusting valve 201 in such a manner that a predetermined amount of water vapor flows through the reforming portion 5. A molar flow rate of the water vapor flowing through the reforming portion 5 is necessarily equal to or more than at least 2.5 times a molar flow rate of the carbon included in the input power generating fuel 101. If possible, it is preferable to circulate a maximum flow rate within an allowable flow rate range of the circulation driving means 6. Thereafter, the combustion air 100 supplied to the reducing combustion gas generating apparatus 7 is shut off, and the fuel 101 necessary for generating power is supplied from the same piping in place of the combustion fuel (the combustion fuel and the power generating fuel are identical in the present embodiment).

The combustion gas 112 from the temperature raising auxiliary combustion apparatus 13 may be shut off in some temperature condition of the power generation cell 1 and the reforming portion 5, however, in the case that the temperature is significantly low, the operation of the temperature raising auxiliary combustion apparatus 13 may be carried on.

If the combustion air 100 is shut off, the heat source for heating the power generation cell 1 and the reforming portion 5 is temporarily lost, whereby the temperature is lowered. Accordingly, it is necessary to previously heat higher while allowing for the lowered degree. Alternatively, there is employed the method of carrying on the operation of the temperature raising auxiliary combustion apparatus 13, as mentioned above. Further, in order to suppress the temperature reduction of the reforming portion 5, it is possible to put the air 104 for raising the temperature of the cathode and generating power fed to the combustion gas cooler 8 in the bypass piping 12 by adjusting an opening degree of a bypass valve 200.

The reforming gas including the hydrogen and reformed in accordance with the water vapor reforming reaction in the reforming portion 5 carries out an electrochemical reaction by the anode 3. The temperature of the power generation cell 1 is raised on the basis of a heat generating operation caused by the electrochemical reaction, and the heating is carried on further until reaching the temperature of the rated condition.

In this case, the necessary water vapor is supplied to the reforming portion 5 by circulating the water vapor included in the reducing combustion gas 108 generated from the reducing combustion gas generating apparatus 7, just before starting the power generation, however, since the combustion stops at the same time of starting the power generation, the water vapor is not supplied from the reducing combustion gas generating apparatus 7. In place thereof, the water at an amount equal to or more than an amount used in the reforming reaction is generated by the electrochemical reaction in the anode 3, and it is possible to secure the water vapor which is necessary for the reforming reaction in the reforming portion 5 in the reaction used fuel gas 105 which is recycled to the circulation driving means 6 from the anode 3.

The remaining gas 106 which is not recycled in the reaction used fuel gas 105 in the outlet of the anode 3 is supplied to the combustion chamber 10, and generates the combustion exhaust gas 103 in accordance with a burning reaction with the reacted air 107. The combustion exhaust gas 103 preheats the power generating air 104 via the air preheater 9, flows through the combustion exhaust gas flow path 15 of the reforming portion 5 so as to be used as a heat source of the reforming reaction, and is thereafter discharged out of the system.

Entering into a step of heating while generating power as mentioned above, the temperature of the power generation cell 1 is controlled by adjusting the flow rate of the power generating air 104 until reaching a predetermined power generation load, the supply amount of the fuel 101 is increased little by little, and the flow rate of the recycle gas (the reaction used fuel gas) 105 is controlled in conformity to the change of the supply amount of the fuel 101 by the circulation driving means 6, thereby reaching the predetermined air flow rate, fuel flow rate and recycle flow rate.

In this case, since the recycle flow rate is definitely determined by setting a ratio of the water vapor and the carbon in the reforming portion 5, the recycle flow rate can be determined on the basis of the flow rate of the supplied power generating fuel 101. Accordingly, it becomes easy to control the temperature of the step of raising temperature while taking it in the signal of the recycle control so as to raise the load, by previously determining the recycle flow rate with respect to the flow rate increase pattern of the fuel 101.

A recycle rate (that is, recycle flow rate/anode outlet gas flow rate) becomes smaller in accordance with coming closer to the operating state at a time of the rated power generation in comparison with the initial stage of the operation. For example, in the case that the fuel is constituted by the methane, such a recycle rate as to keep a steam/carbon ratio 2.5 is about 65%, and the flow rate of the recycle gas (the reaction used fuel gas) 105 comes down to about 1.9 times the flow rate of the gas 106 conducted to the combustion chamber 10 without being recycled. At a time of starting the operation, the flow rate is small, however, comes to about 3 to 4.

Embodiment 2

Figure 2:
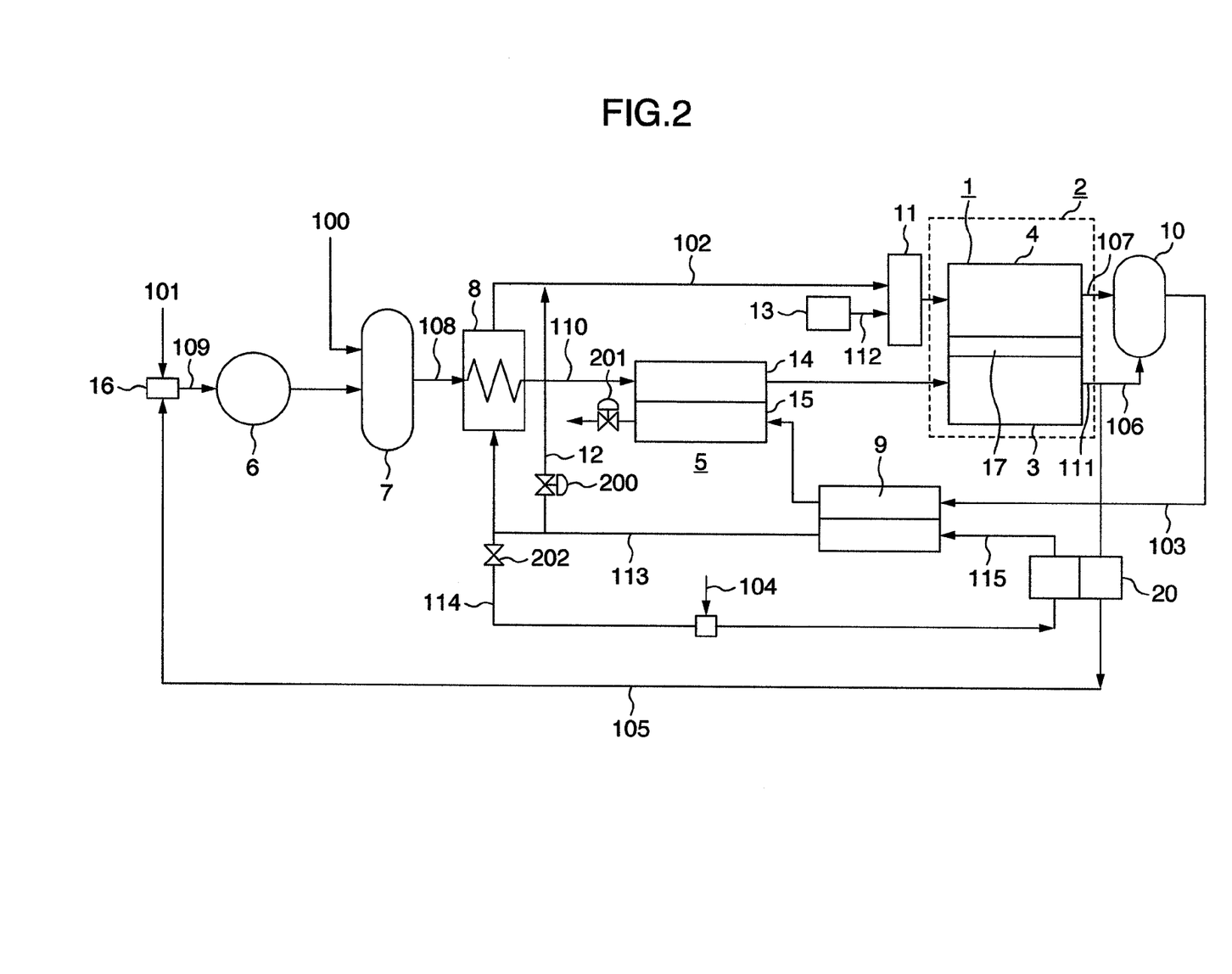
FIG. 2 is a view of a system structure showing an embodiment 2 of the fuel cell generation system in accordance with the present invention.

FIG. 2 shows an embodiment 2 of the fuel cell generation system in accordance with the present invention. In the present embodiment, a recycle gas cooler 20 in which the recycle gas 105 flows is newly installed between the outlet of the anode 3 and the mixing portion 16 in the embodiment 1 mentioned above. The recycle gas cooler 20 exchanges heat between the recycle gas branched in the outlet of the anode 3 and the air 104 in the atmospheric air coming to the air for raising the temperature of the cathode and generating power, and cools the recycle gas. Accordingly, since the temperature of the recycle gas in the inlet of the circulation driving means 6 is lowered, an expensive driving means having a high temperature specification is not necessary, and it is possible to use an inexpensive circulation driving means having a low temperature specification, for example, a blower and a fan.

A description will be in more detail given below of an operation of the fuel cell generation system.

At a time of heating by generating the reducing combustion gas 108, the air from the outlet of the recycle gas cooler 20 is conducted to the air manifold through the bypass piping 12. At this time, a part of the air 104 is supplied as a cooling air 114 by opening an opening and closing valve 202, and the reducing combustion gas 108 is cooled by the combustion gas cooler 8.

Next, in the case of heating by the power generation of the power generation cell 1, the combustion air 100 is shut off, the reducing combustion gas 108 is not generated in the reducing combustion gas generating apparatus 7, and the reaction used fuel gas 105 from the outlet of the anode 3 is mixed with the power generating fuel 101, and is only recycled as the mixed gas 109. It is necessary to return the mixed gas 109 passing through the circulation driving means 6 and the reducing combustion gas generating apparatus 7 to the temperature before being cooled by the recycle gas cooler 20 in advance of getting in the reforming portion 5. Accordingly, the structure is made such as to maintain the temperature of the reforming portion 5 so as not to prevent the temperature rising of the anode 3 as much as possible, by closing the bypass valve 200 and putting a whole amount of the air 115 heated by the recycle gas cooler 20 in the combustion gas cooler 8 so as to heat up the mixed gas 109.

In other words, in the fuel cell generation system in accordance with the present invention, the combustion gas cooler 8 has a feature including a function of the cooler of the recycle gas in conjunction with a function of the heater at a time of starting. In accordance with the system structure and the operating method mentioned above, it is possible to apply the circulation driving means 6 having a low heat resistance.

Embodiment 3

Figure 3:
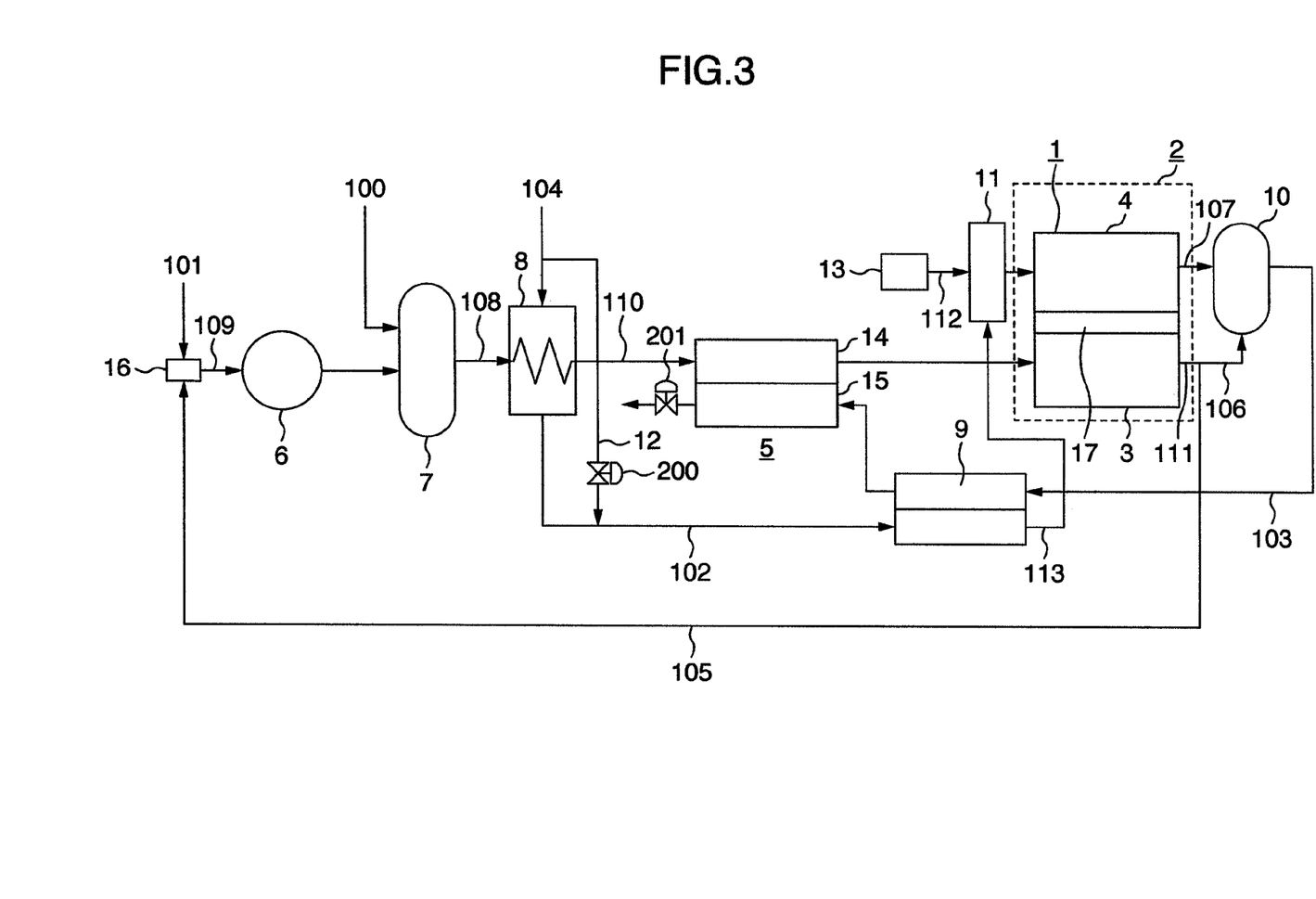
FIG. 3 is a view of a system structure showing an embodiment 3 of the fuel cell generation system in accordance with the present invention.

FIG. 3 shows an embodiment 3 of the fuel cell generation system in accordance with the present invention. In the present embodiment, the air for raising the cathode and generating the power is put in the combustion gas cooler 8, the air preheater 9 and the air manifold 11 alphabetically. The air flow direction is inverted to the embodiments 1 and 2. Accordingly, the cooling effect of the reducing combustion gas 108 in the combustion gas cooler 8 is given top priority to the starting time, and it is possible to control the temperature of the combustion gas 110 in the outlet of the combustion gas cooler 8 more directly.

In this case, there can be considered a case that the difference between the temperature of the heating air 102 in the outlet of the combustion gas cooler 8 and the temperature of the combustion exhaust gas flowing into the air preheater 9 becomes small or they are inverted. Accordingly, the heat quantity transmitted to the air manifold 11 is small, and there is a possibility that the heating of the cathode 4 is affected. In this case, the temperature raising auxiliary combustion apparatus 13 compensates.

Figure 4A:
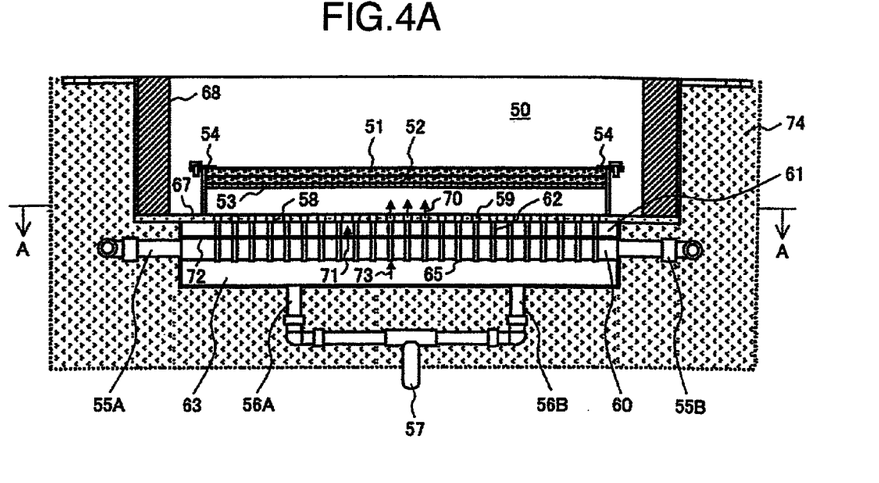
FIG. 4A is a cross sectional view of a reducing combustion gas generating apparatus of a fuel cell generation system in accordance with the present invention.
Figure 4B:
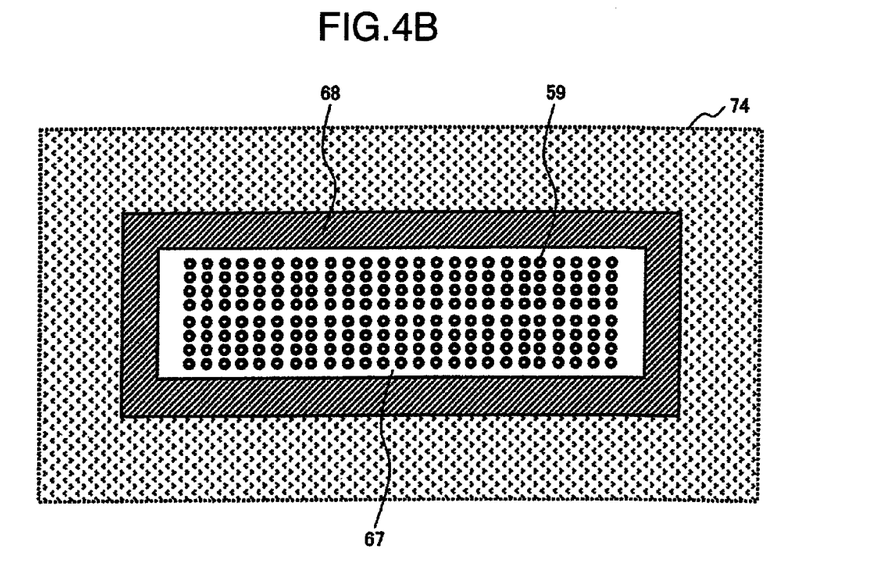
FIG. 4B is a plan view along a line A-A of the reducing combustion gas generating apparatus of the fuel cell generation system in accordance with the present invention.

FIGS. 4A and 4B show a specific structure of the reducing combustion gas generating apparatus 7 described in the embodiments 1 to 3 mentioned above. The fuel for burning or a fuel gas is introduced to the fuel piping 57. The fuel gas is obtained by mixing the fuel with the reducing combustion gas recycled from the outlet of the anode and having a low calorific power. and a large flow rate. The fuel piping 57 is connected to a fuel header 63 through branch pipes 56A and 56B. The fuel header 63 is provided with a lot of cylindrical fuel nozzles 62, and a fuel 73 getting in the fuel header 63 flows in from an inflow port 65 of the fuel nozzle.

On the other hand, the air necessary for burning is fed to the air chamber 60 from the branch pipes 55A and 55B. An air 71 within the air chamber 60 is rectified through a porous plate 72, and is fed to the air header 61. The fuel nozzle 62 is connected to a plate 67 coming into contact with an upper portion of the air header 61, and a nozzle hole 59 which is larger than a bore diameter of the fuel nozzle 62 is formed therein. The air flows in the nozzle hole 59 from a circular ring portion 58 formed between the fuel nozzle 62 and the nozzle hole 59, is rapidly mixed with the fuel 73 flowing in the fuel nozzle 62, and comes to an air-fuel mixture 70 so as to be fed to the combustion chamber 50.

The air-fuel mixture 70 from the nozzle hole 59 is burnt in the combustion chamber 50, however, is not necessarily burnt in all the nozzle holes 59 due to an unevenness of the flow rate from each of the nozzle holes 59. Accordingly, in order to more stably and uniformly carry out the combustion, an upper portion of the nozzle hole 59 is provided with two stages of ceramic forms 51 and 52 which are supported by a punching board 53 and are fixed by a pressure plate 54, and the premixed air 71 is burnt on a surface of the upper stage ceramic form 51. Further, a heat radiation to the external portion is inhibited by arranging a heat insulating material 68 around the combustion chamber 50 and covering a whole of the reducing combustion gas generating apparatus 7 by a heat retaining material 74.

It should be further understood by those skilled in the art that the foregoing description has been made on embodiments of the invention and that various changes and modifications may be made in the invention without departing from the spirit of the invention and the scope of the appended claims.

The invention claimed is:

1. A solid oxide fuel cell generation system comprising:
   a power generation cell including an anode, a cathode and a solid electrolyte membrane;
   a mixing portion configured to generate a mixed gas by mixing a used fuel gas discharged from said anode with a raw fuel;
   a reducing combustion gas generating apparatus configured to generate a reducing combustion gas; and
   a reforming portion,
   wherein the reducing combustion gas generating apparatus has a starting burner,
   wherein said mixing portion and said reducing combustion gas generating apparatus are connected by a piping configured to circulate the mixed gas generated in said mixing portion, and
   wherein said reducing combustion gas generating apparatus and said reforming portion and said anode are connected by a piping external to said reducing combustion gas generating apparatus configured to circulate the reducing combustion gas among said reducing combustion gas generating apparatus, said reforming portion and said anode through said piping.

2. A solid oxide fuel cell generation system as claimed in claim 1, wherein a combustion gas cooler configured to provide heat exchange between an air fed to said cathode and said reducing combustion gas is provided between the reducing combustion gas generating apparatus and the reforming portion.

3. A solid oxide fuel cell generation system as claimed in claim 2, wherein the solid oxide cell generation system is provided with a bypass piping configured to feed the air fed to said cathode without putting through said combustion gas cooler.

4. A solid oxide fuel cell generation system as claimed in claim 1, wherein said starting burner of said reducing combustion gas generating apparatus comprises a combustion burner.

5. A solid oxide fuel cell generation system comprising:
a power generation cell including an anode, a cathode and a solid electrolyte membrane;
a mixing portion configured to generate a mixed gas by mixing a used fuel gas discharged from said anode with a raw fuel;
a circulation driving means configured to circulate said used fuel gas;
a reducing combustion gas generating apparatus configured to generate a reducing combustion gas; and
a reforming portion,
wherein the reducing combustion gas generating apparatus has a starting burner,
wherein said mixing portion and said reducing combustion gas generating apparatus are connected via said circulation driving means by a piping configured to circulate the mixed gas generated in said mixing portion, and
wherein said reducing combustion gas generating apparatus and said reforming portion are connected by a piping external to said reducing combustion gas generating apparatus configured to circulate the reducing combustion gas between said reducing combustion gas generating apparatus and said reforming portion through said piping.

6. A solid oxide fuel cell generation system as claimed in claim 5, wherein a combustion gas cooler configured to provide heat exchange between an air fed to said cathode and said reducing combustion gas is provided between the reducing combustion gas generating apparatus and the reforming portion.

7. A solid oxide fuel cell generation system as claimed in claim 6, wherein the solid oxide cell generation system is provided with a bypass piping configured to feed the air fed to said cathode without putting through said combustion gas cooler.

8. A solid oxide fuel cell generation system as claimed in claim 5, wherein said starting burner of said reducing combustion gas generating apparatus comprises a combustion burner.

9. A solid oxide fuel cell generation system as claimed in claim 5, further comprising a recycle gas cooler configured to heat exchange used combustion gas discharged from an outlet of said anode and air fed to said cathode, between an outlet of said anode and said mixing portion.

* * * * *